United States Patent [19]

Koch

[11] Patent Number: 4,859,127

[45] Date of Patent: Aug. 22, 1989

[54] SPRING WIRE FASTENER AND METHOD OF USING SAME

[75] Inventor: Frank J. Koch, Ogdensburg, N.Y.

[73] Assignee: Linda Koch Beamish, Ontario, Canada

[21] Appl. No.: 201,832

[22] Filed: Jun. 3, 1988

[51] Int. Cl.$^4$ ............................................. F16B 13/04
[52] U.S. Cl. ......................................... 411/16; 29/446; 29/525.1; 411/107; 411/173; 411/182; 411/340; 411/508
[58] Field of Search ................. 411/16, 173, 340, 342, 411/438, 508, 913, 153, 251, 252, 341, 343, 350, 981, 17, 107, 182; 29/446, 526.1

[56] References Cited

U.S. PATENT DOCUMENTS

| | | | |
|---|---|---|---|
| 1,264,677 | 4/1918 | Murrell | 411/438 |
| 1,370,319 | 3/1921 | Kennedy | 411/341 |
| 1,468,074 | 9/1923 | Peirce | 411/16 |
| 2,201,930 | 5/1940 | Stark | 411/153 X |
| 2,515,220 | 7/1950 | Hattan | 411/929.1 X |
| 2,563,976 | 8/1951 | Torosian | 411/544 |
| 2,649,830 | 8/1953 | Arnold | 411/16 |
| 3,373,647 | 3/1968 | Sherock | 411/16 |
| 4,040,462 | 8/1977 | Hattan | 411/929.1 X |
| 4,083,162 | 4/1978 | Regan et al. | 411/508 X |
| 4,086,840 | 5/1978 | Kurlander | 411/913 X |

Primary Examiner—Gary L. Smith
Assistant Examiner—Douglas E. Ringel
Attorney, Agent, or Firm—Burns, Doane, Swecker & Mathis

[57] ABSTRACT

A coiled spring wire fastener includes a first end for engaging with the head of a bolt, a midsection of a constant diameter and a second end portion of a conically, tapered shape. In an alternative embodiment, the coiled spring wire fastener includes an annular midsection for engaging a threaded portion of a bolt, a first annular end portion connected to the annular midsection and having a smaller internal diameter than that of the midsection, and a conically tapered second end portion.

29 Claims, 6 Drawing Sheets

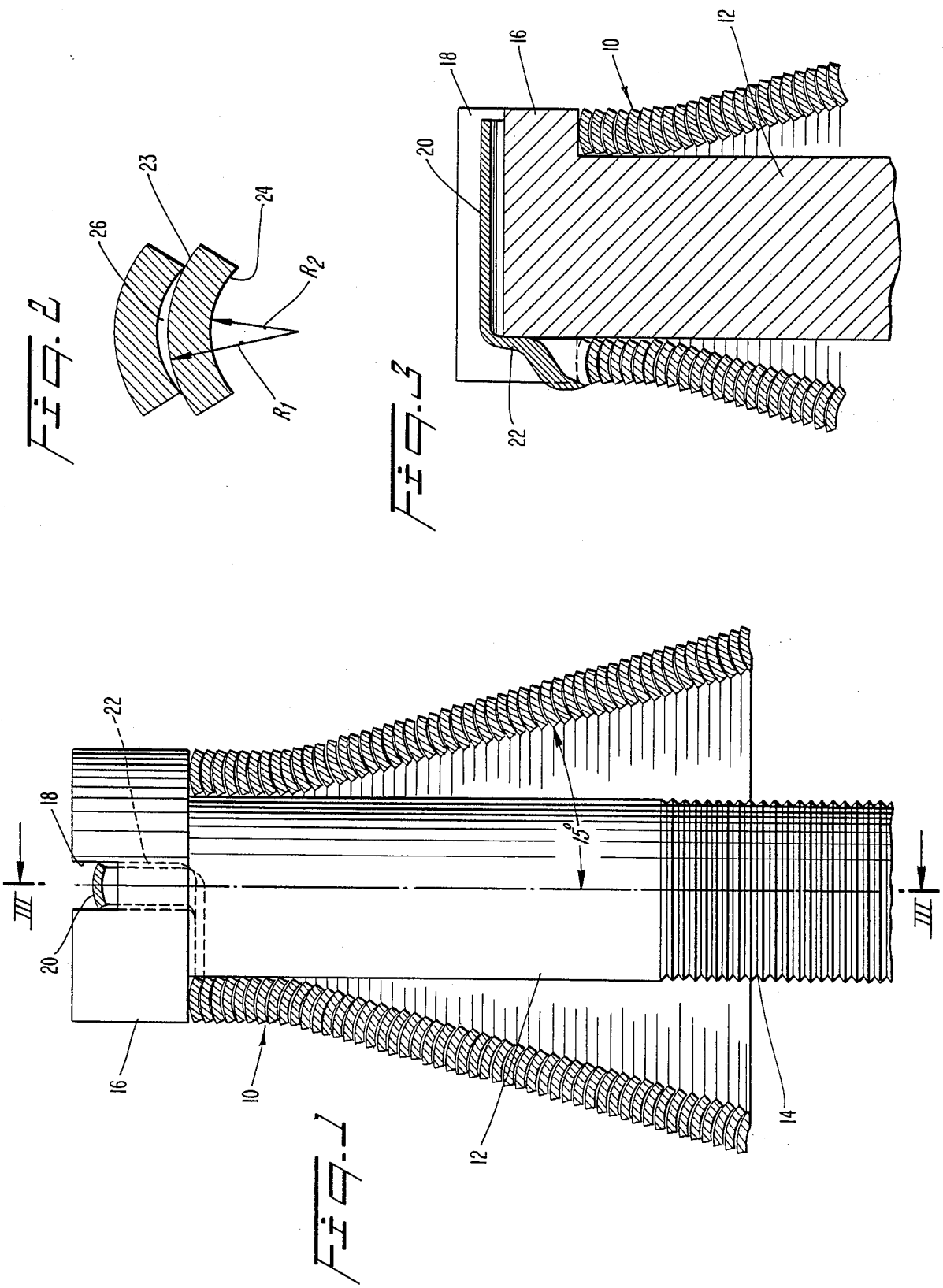

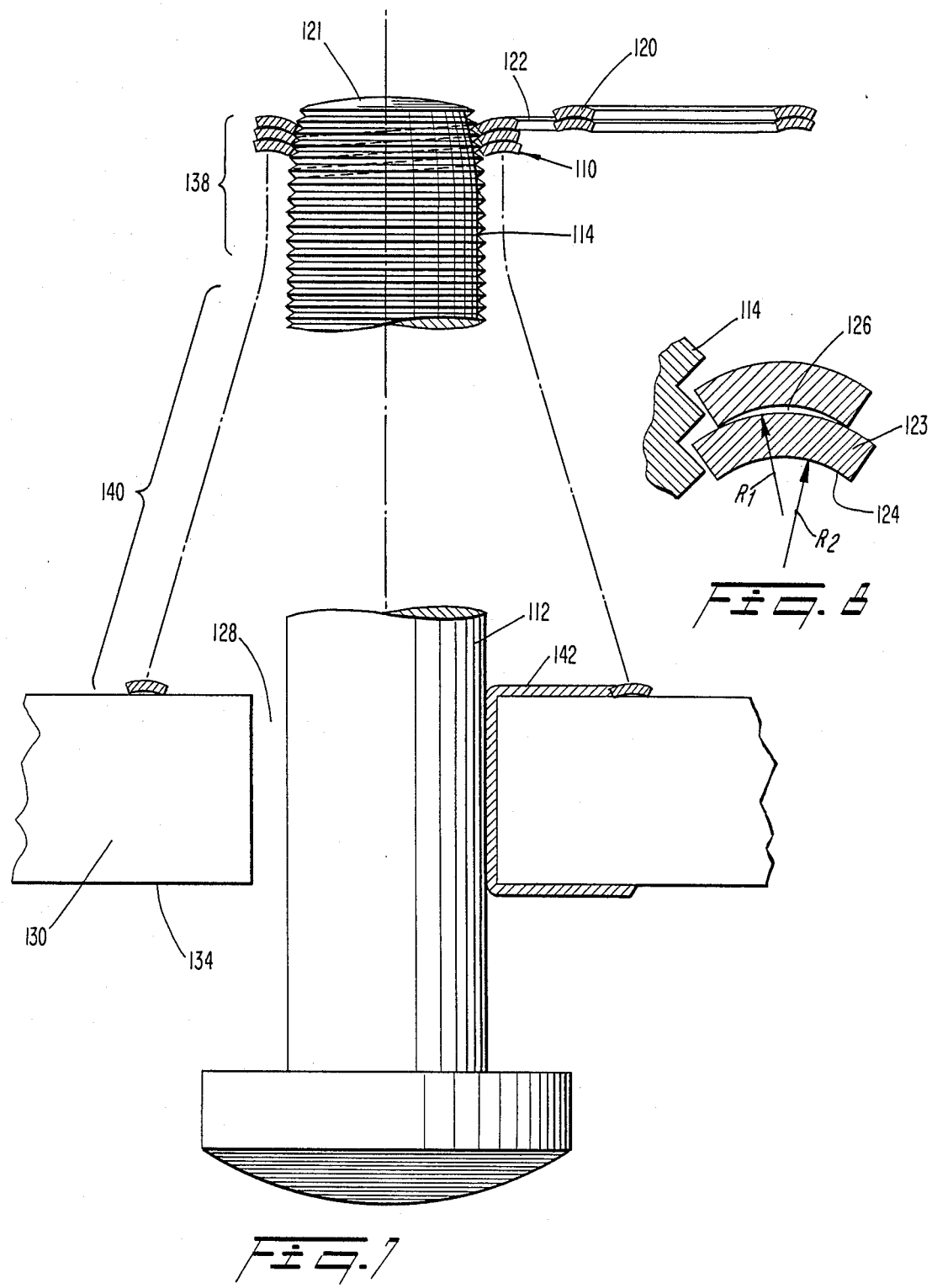

SPRING WIRE FASTENER AND METHOD OF USING SAME

BACKGROUND OF THE INVENTION

1. Field of the Invention

The present invention relates to fasteners, and more particularly to fasteners that enable a bolt to be secured through a blind hole, i.e., a hole in a panel wherein access may be had to only one side of the panel.

2. Description of Related Art

When fastening a bolt through a blind hole, one is confronted with the problem of providing a device on the blind side of the hole for retaining the bolt within the hole. One approach has been to insert a sleeve between the bolt and the side wall of the hole in order to frictionally engage the bolt within the hole. Examples of such sleeves are shown in U.S. Pat. No. 1,468,074, issued to R. S. Peirce and U.S. Pat. No. 3,373,647 issued to D. M. Sherock. A problem with such sleeves is that they depend on the strength and cohesiveness of the side wall of the hole for structural stability. In cases where the panel through which the hole extends is made from a friable or weak material, the sleeve may not provide adequate support for the bolt.

A more sophisticated sleeve is disclosed in U.S. Pat. No. 2,649,830, issued to J. W. Arnold. The Arnold sleeve includes a first portion for engaging with the side wall of the hole and a second portion for engaging with a threaded portion of the bolt. However, the Arnold sleeve is also dependent upon the structural integrity of the side walls of the hole, and further requires preparation of the surface adjacent the hole prior to its use. For example, recesses are required in the surface adjacent the hole to retain tabs projecting radially from the first portion of the sleeve.

A further problem with the sleeve-type devices is that they are not usable with thin panels, such as panels of sheet metal. In such cases, the side wall of the hole is very shallow, thus not providing a sufficient surface area for the sleeve to engage.

Others have attempted to retain a bolt in a blind hole by providing some kind of washer or nut that is able to be deformed or manipulated so as to be inserted through the hole, after which it can then be rearranged or reconfigured in a manner so as to engage the blind side of the panel through which the hole extends.

A commonly known example is the toggle bolt, which includes a collapsible crosspiece having a threaded portion in the center thereof through which a bolt is inserted. In operation, the crosspiece is collapsed at its center such that each half thereof lies parallel with the bolt, and is inserted through a hole. After insertion through the hole, the crosspiece, which is spring biased in an open position, unfolds so that it may function as a nut on the blind side of the surface containing the hole.

A problem with toggle bolts is that they are relatively complex in that they require a plurality of moving components that require assembly. An additional problem with toggle bolts is that they provide limited bearing contact with the blind side of the panel adjacent the hole and thus provide only limited absorption of stresses in a direction perpendicular to the longitudinal axis of the bolt. A further problem with toggle bolts is that they require a hole that is significantly larger than the diameter of the bolt used with the toggle.

U.S. Pat. No. 1,370,319, issued to J. Kennedy, discloses a form of toggle bolt that has a plurality of collapsible plate springs mounted at one end of a bolt and a standard nut at the other end of the bolt. In operation, the springs are collapsed and inserted through a blind hole in a panel until the springs are able to return to their normal, extended position. The nut is then tightened up on the bolt until a compressive force is exerted on the panel through which the bolt extends. The Kennedy toggle bolt suffers from the same disadvantages as the conventional toggle bolt described above in that it requires a plurality of components to assemble, and it makes only limited bearing contact with the surface adjacent to the hole through which the bolt is inserted. A further problem with the Kennedy toggle bolt is that is not usable on a standard bolt. It requires a special threaded shaft adapted to receive the plate springs.

U.S. Pat. No. 4,086,840, issued to R. A. Kurlander, discloses a hollow wall fastener that comprises a conical member comprised of an elastomeric material adapted to be collapsed radially for insertion through an opening. After it is completely inserted, it returns to its original configuration. The fastener is then deformed in a longitudinal direction in order to function as a washer on the blind side of the opening. A problem with the Kurlander fastener is that because it is made of an elastomeric material, the fastener is not able to withstand strong forces in the longitudinal direction.

U.S. Pat. No. 2,563,976, issued to E. Torosian, discloses a coiled attachment device that is intended for securing a bolt within a blind hole in a sheet metal panel. The Torosian device includes a spring washer of a specific gauge and pitch, and a coiled spring of a second gauge and pitch adapted to be collapsed within the center of the spring washer. The Torosian attachment device requires the careful alignment of the coiled spring within the center opening of the spring washer, and thus appears awkward to assemble and use. A further disadvantage of the Torosian attachment device is that it is only usable on thin panels that are able to fit between the gap in the spring washer.

SUMMARY OF THE INVENTION

In view of the foregoing limitations and shortcomings of the prior art devices, as well as other disadvantages not specifically set forth above, it should be apparent that, prior to the present invention, there existed a need in the art for a convenient, easy to use and easy to manufacture, fastener for enabling a bolt to be mounted in a blind hole. It is, therefore, a primary object of this invention to fulfill that need by providing such a fastener.

Briefly described, these and other objects are accomplished according to the present invention by providing a coiled spring wire fastener that is intended to be used with a bolt to secure the bolt within a blind hole. The fastener includes a first end and a midsection of a constant diameter intended for engaging with the head of the bolt, and a second end portion of a conically, tapered shape intended to engage the surface area adjacent the blind hole. In an alternative embodiment, the coiled spring wire fastener includes an annular midsection for engaging a threaded portion of the bolt, a first annular end portion connected to the annular midsection and having a smaller internal diameter than that of the midsection for controlling movement of the bolt through the midsection, and a conically tapered second end portion for engaging with the surface area adjacent the blind hole.

The nature of the present invention may be more clearly understood by reference to the following detailed description of the invention, the appended claims, and the attached drawings.

BRIEF DESCRIPTION OF THE DRAWINGS

FIG. 1 is a side elevational view of the spring wire fastener according to a preferred embodiment of the present invention;

FIG. 2 is a detailed cross-sectional view of a portion of the spring wire fastener of FIG. 1;

FIG. 3 is a cross-sectional view taken along line III—III of FIG. 1;

FIG. 7 is a side elevational view of an alternative preferred embodiment of a spring wire fastener according to the present invention;

FIG. 8 is a cross-sectional view of a portion of the spring wire fastener of FIG. 7;

DESCRIPTION OF THE PREFERRED EMBODIMENTS

Figure 4:
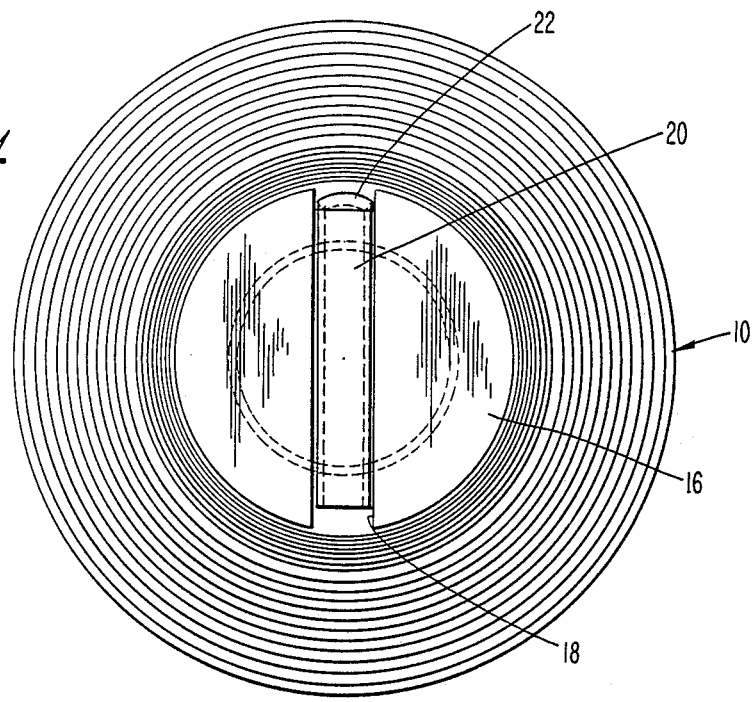
FIG. 4 is a top plan view of the spring wire fastener of FIG. 1.

Referring now in detail to the drawings, wherein like parts are designated by like reference numerals throughout, there is illustrated in FIG. 1 a spring wire fastener according to the present invention and designated generally by reference numeral 10. The spring wire fastener 10 is adapted for use on a standard slotted head bolt 12. The bolt 12 has a threaded portion 14 at one end thereof and a head 16 at an opposite end thereof. A slot 18 extends diametrically across the top portion of the head 16.

With reference to FIGS. 1 and 3, a first end of the spring wire fastener 10 includes a straight tab portion 20 that is adapted to be retained in the slot 18 of the head of the bolt. The tab 20 extends across the fixed head of the shaft so as to prevent the spring wire fastener from sliding axially along the shaft. At one end of the tab 20, the spring wire fastener 10 curves downwardly to form an extension 22 for connecting the tab 20 to the remainder of the spring wire fastener 10. At the end of the extension 22, the spring wire fastener 10 is formed into a coil having an inner diameter that approximates the outer diameter of the shank of the bolt 12. For the first five to ten turns of the coil the diameter of the coil is constant. After the constant diameter portion, the diameter of the spring wire fastener 10 increases gradually with each revolution so as to form a conical taper. In a preferred embodiment of the present invention, the cone is tapered at an angle of about 15° from a center line of the spring wire fastener 10.

With reference to FIG. 2, an enlarged cross-sectional view of two turns of the spring wire fastener 10 is shown. The top surface 23 of the spring wire is convex and has a radius R1 that is slightly larger than the radius R2 of the lower surface 24 of the spring wire. Therefore, when the wire is coiled so that adjacent turns are aligned one on top of each other, as shown in FIGS. 1–3, a cavity 26 is created between each turn of the wires.

With reference now to FIG. 4, a top plan view of the spring wire fastener 10 mounted on a bolt is illustrated. As shown in FIG. 4, the outer peripheral edge of each turn of the wire in the tapered portion of the spring wire fastener 10 extends outwardly from the turn above it.

Figure 5:
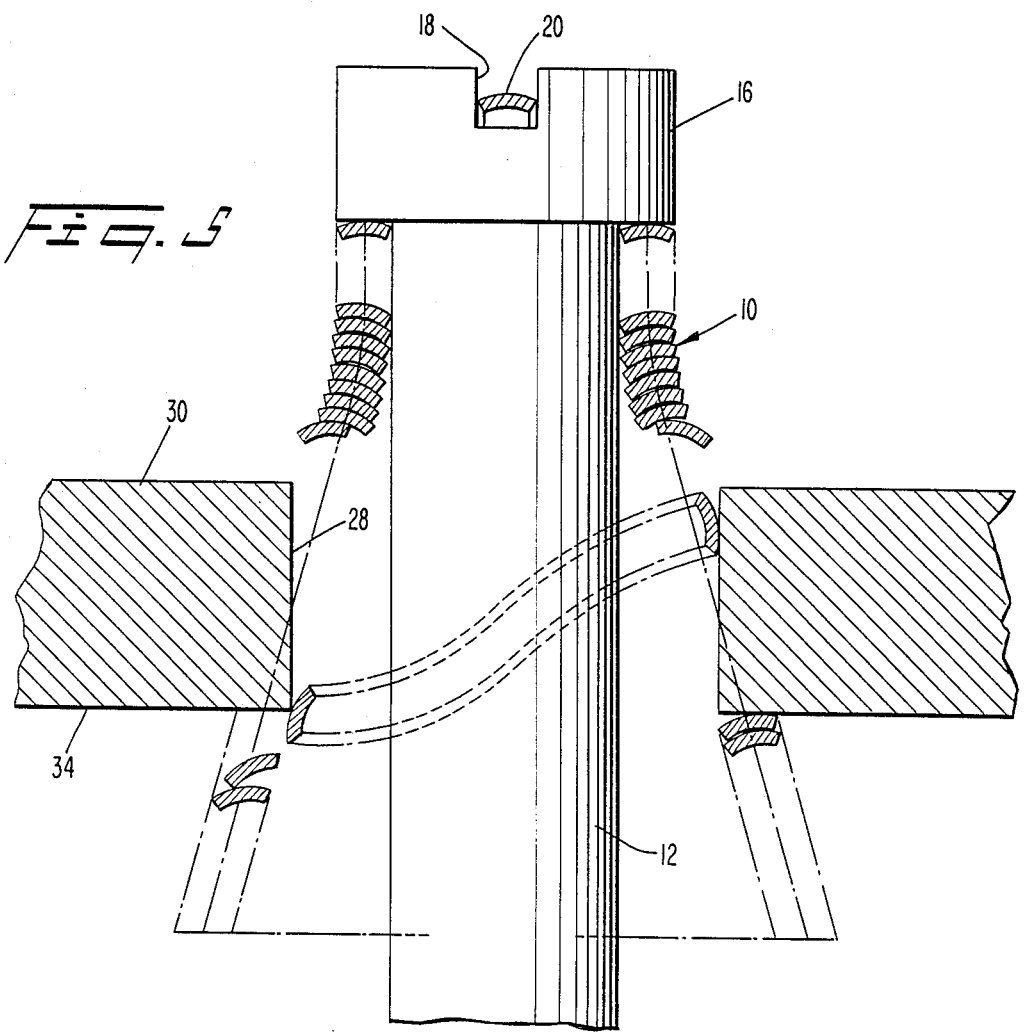
FIG. 5 is a side elevational view of a portion of the spring wire fastener of FIG. 1 as the fastener is being manipulated through an opening.

Turning attention now to FIG. 5, the operation of the spring wire fastener 10 of the present invention is illustrated together with a panel 30 having an opening 28 therein, wherein access is available to only on side 34 of the panel 30. Preferably, the diameter of the opening 28 should be greater than the outer diameter of the portion of the spring wire fastener 10 having a constant diameter, and less than the inner diameter of the fastener 10 at the widest end of the tapered portion.

To secure the bolt 12 to the panel 30, the head 16 of the bolt 12 and the spring wire fastener 10 are inserted through the opening 28, leaving a part of the threaded end of the bolt extending from the accessible side of the panel. The portion of the spring wire fastener 10 having a constant diameter should pass freely through the opening 28 because the outside diameter of that portion is preferably less than the diameter of the opening 28. However, at the portion of the spring wire fastener 10 where the diameter tapers outwardly, the spring wire fastener 10 must temporarily deform, as illustrated in FIG. 5, in order to pass through the opening 28. To facilitate passing the fastener 10 through the opening, the bolt 12 is rotated clockwise so as to "wind" the fastener 10 through the opening 28.

The spring wire is made from a high carbon spring steel and is sufficiently thin so that it easily deforms temporarily so as to enable the fastener 10 to pass through the opening 28. In one preferred embodiment, the thickness of the spring wire is less than 0.027 inches.

Figure 6:
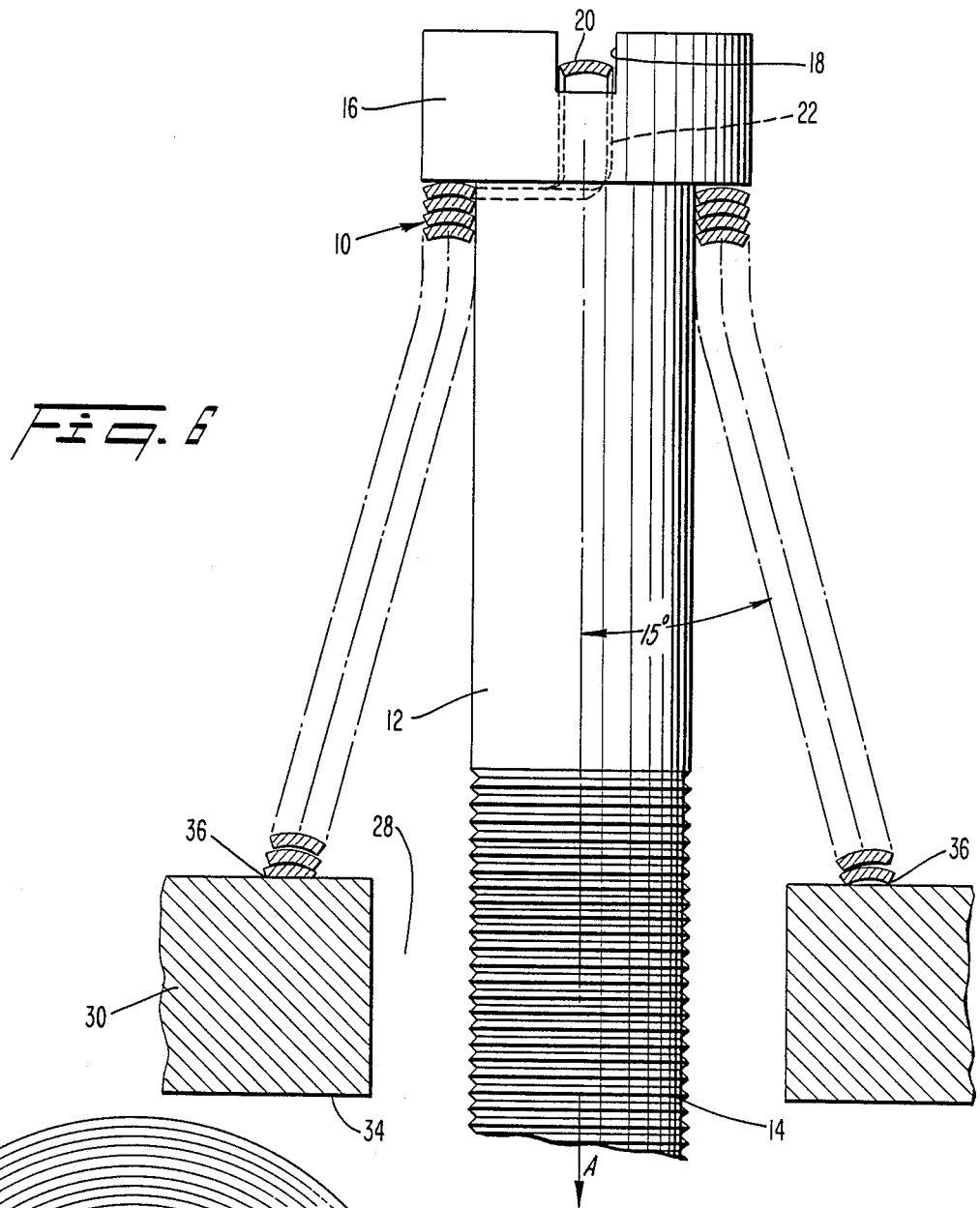
FIG. 6 is a side elevational view of the spring wire fastener of FIG. 1 in position against a panel.

With reference to FIG. 6, once the spring wire fastener 10 has completely passed through the opening 28, the resiliency of the spring wire fastener 10 restores the fastener 10 to its original configuration. The bolt 12 is then pulled longitudinally in the direction of arrow A until the end 36 of the spring wire fastener 10 engages the panel 30.

The end 36 of the spring wire fastener 10 makes an annular surface contact with the panel 30 in an area completely surrounding the opening 28. Because the spring wire is resilient, the fastener 10 has sufficient flexibility to conform to minor irregularities in the surface of the panel 30. Such contact enables longitudinal forces to be evenly distributed about the opening 28, thus increasing the ability of the spring wire fastener 10 and the panel 30 to absorb longitudinal forces.

A conventional washer and nut (not shown) are secured onto the threaded end portion 14 of the bolt 12 projecting from the accessible side of the panel and tightened up against the surface 34 of the panel 30, thus exerting a compressive force on the spring wire fastener 10.

Because of the resiliency of the material from which the spring wire fastener 10 is made, and because of the cavity 26 created between each turn of the spring wire, when the nut is tightened up on the bolt 12, adjacent layers of the arcuate spring wire nest together and the spring wire fastener 10 is stressed in a compressive mode so as to exert a tensile force on the bolt 12 between the head 16 and the nut. This force causes the spring wire fastener 10 to function as a Belleville or lock washer, thereby eliminating the need for any additional type of lock washer.

Turning attention now to FIG. 7, a second preferred embodiment of the spring wire fastener 110 of the present invention is disclosed. According to the second preferred embodiment, several turns or revolutions of the spring wire are provided at a threaded section 138 of the spring wire fastener 110. The inner diameter of the threaded section 138 is about the same as the outer diameter of the main threaded portion 114 of a bolt 112 with which the spring wire fastener 110 is intended to be used.

Although the second preferred embodiment of the present invention can be used with a standard bolt, it preferably is used with a bolt 112 having a threaded tip 121 that is tapered inwardly at the first one or two threads.

Turning attention to FIG. 8, which is a detailed cross-sectional view of two turns of the spring wire fastener 110 adjacent the main threaded portion 114 of the bolt 112, the profile formed by adjacent layers of the spring wire effectively forms threads that are adapted to engage the threads of the bolt 112. In this embodiment of the present invention, the thickness of the spring wire should be chosen so as to correspond to the pitch of the threads of the bolt 112.

Figure 9:
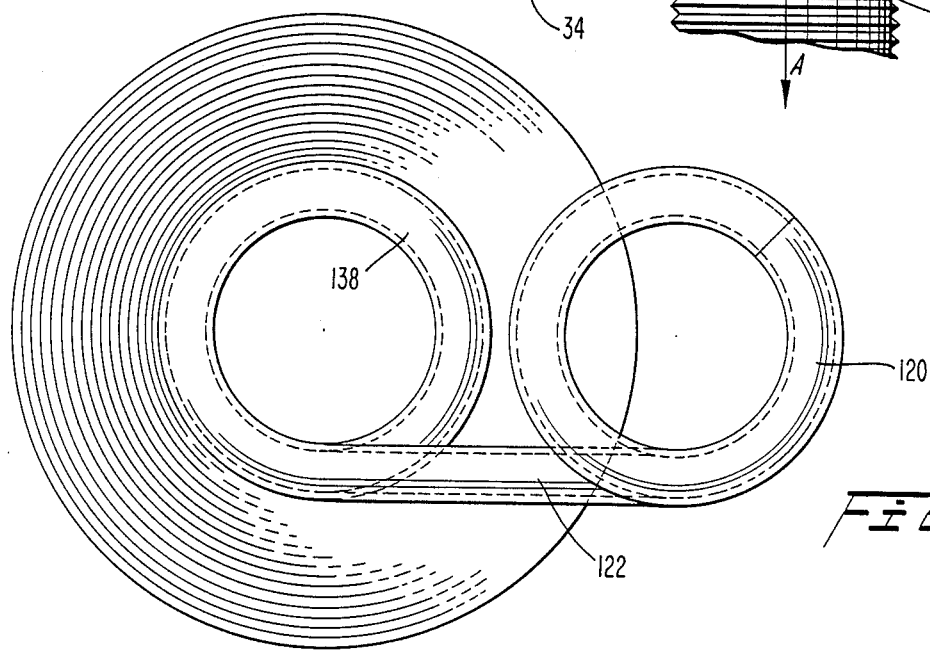
FIG. 9 is a top plan view of the embodiment of FIG. 7.

At a first end 120 of the spring wire fastener 110, at least two complete turns of the spring wire are made with an internal diameter that is slightly smaller than the outer diameter of the main threaded portion 114 of the bolt 112. The internal diameter of the first end 120 is intended to conform to the tapered end portion 121 of the bolt 112. With reference to FIGS. 7 and 9, the end 120 of the spring wire fastener 110 is connected to the threaded section 138 by means of an extension 122. The extension 122 comprises a short, straight length of spring wire connecting the end 120 to the threaded section 138. In a relaxed, unstressed condition, the extension 122 supports the end 120 out of alignment with the threaded section 138, as illustrated in FIGS. 7 and 9.

At the opposite end of the threaded section 138 of the spring wire fastener 110, the spring wire is wound into a tapered conical portion 140, similar to the conical portion of the first preferred embodiment. The conical portion 140 may be tapered at an angle approximately 15° from a center line extending through the center of the spring wire fastener 110.

Extending from the wide end of the conical portion 140 is a hanger 142. The hanger 142 is merely a continuation of the spring wire extending from the conical portion 140. The hanger 142 extends radially inwardly from the conical portion 140 and is formed in a "C" or "U" shape so as to enable it to engage a panel 130 or other surface to which the bolt 112 and spring wire fastener 110 are attached.

Figure 10:
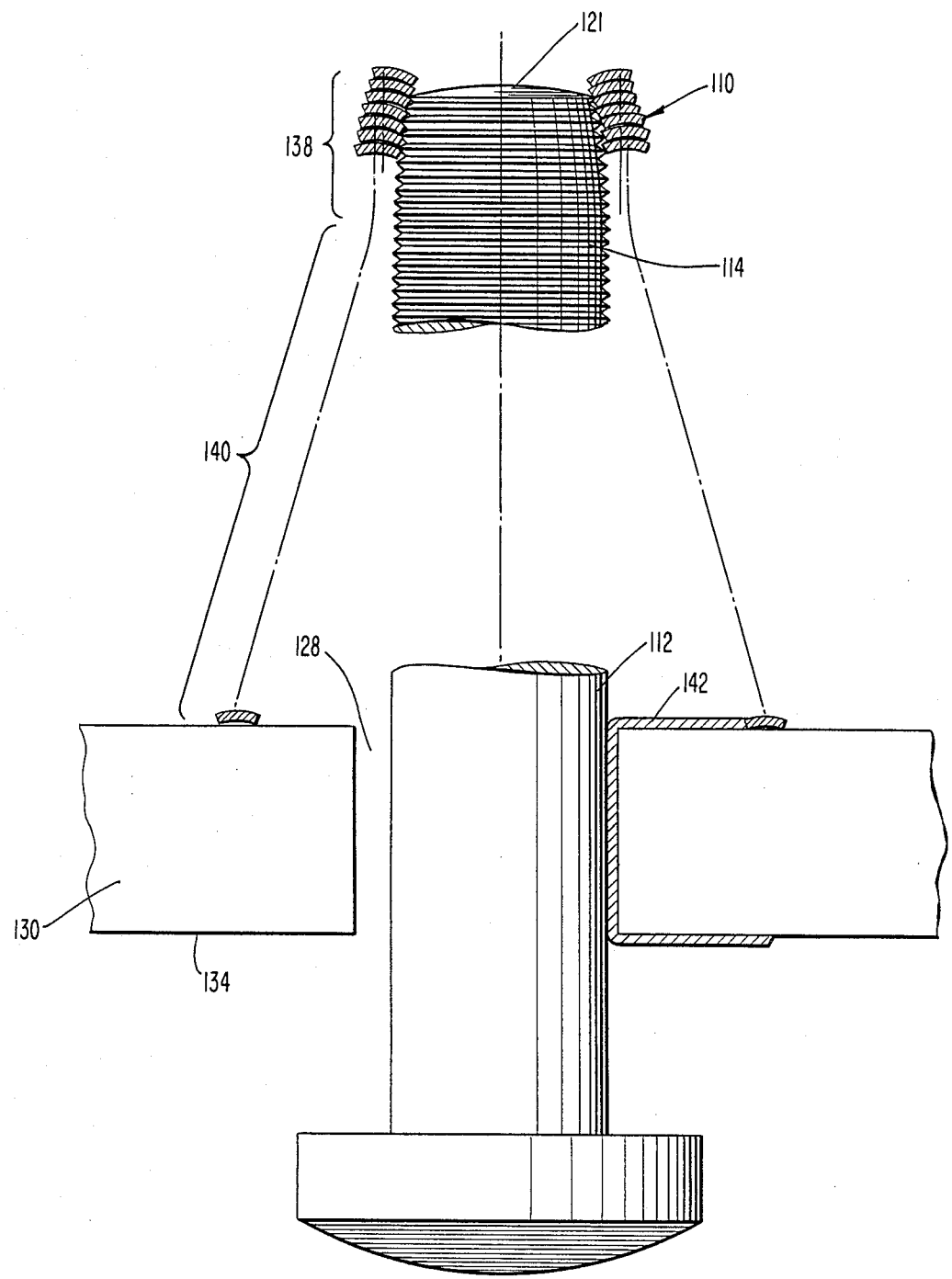
FIG. 10 is a view of the embodiment of FIG. 7 wherein the end section is in alignment with the fastener.

Prior to the insertion of the spring wire fastener 110 through an opening in a panel, the end 120 of the spring wire fastener 110 is aligned with the threaded section 138 so that the turns in the end 120 are concentric with the turns of the threaded section 138 of the spring wire fastener 110. See FIG. 10. While holding the end 120 in alignment with the threaded section 138, the bolt 112 is then threaded through the threaded section 138 of the spring wire fastener 110 until the tip 121 of the bolt 112 engages with the end 120. The bolt 112 is unable to pass through the end 120 because the internal diameter of the end 120 is smaller than the diameter of the main threaded portion 114 of the bolt 112. However, the tip 121 of the bolt 112 is able to engage the end 120, which is in alignment with threaded section 138, as illustrated in FIG. 10.

For purposes of threading the spring wire fastener 110 through an opening 128 in the panel 130, it is advantageous to have the end 120 engaged with the tip 121 of the bolt 112 so that the bolt 112 may be rotated in a clockwise direction with respect to the fastener 110 without having the spring wire fastener 110 thread itself longitudinally down the length of the bolt 112. Because the main threaded portion 114 of the bolt 112 is unable to pass through the end !20, the spring wire fastener 110 remains at the end of the bolt even when the bolt 112 is rotated in a clockwise direction.

In operation, the end 120 of the spring wire fastener 110 is held in alignment with the threaded section 138 of the spring wire fastener 110 while the bolt 112 is threaded through the threaded section 138 so as to engage the tip 121 of the bolt 112 with the end 120. The bolt 112, together with the spring wire fastener 110 thereon, is then inserted through the opening 128 in the panel 130.

It is preferable that the spring wire fastener 110 be used in openings, the diameter of which is larger than the outer diameter of the threaded section 138 yet smaller than the diameter at the widest end of the conical portion 140.

Once the threaded section 138 and the end of the bolt 112 are inserted into the hole 128, the bolt 112 is rotated clockwise so as to "wind" the conical portion 140 of the spring wire fastener 110 through the opening 128. Because the spring wire is made from a thin high carbon spring steel, the fastener 110 is able to be temporarily deformed in order to fit through the opening 128. The bolt 112 is rotated in a clockwise direction until all of the conical portion 140 of the spring wire fastener 110 has passed through the opening 128 and the hanger 142 is engaged with the panel 130. See FIG. 10.

Once the bolt 112 and spring wire fastener 110 are threaded through the opening 128 a distance sufficient to engage the hanger 142 with the peripheral surface of the opening 128, as shown in FIG. 10, the bolt 112 is then backed off one or two revolutions so as to free the end 120 of the spring wire fastener 110. Once the bolt 112 is backed away from the end 120, the end 120 swings outwardly into its relaxed, unstressed position, as shown in FIGS. 7 and 9. The bolt 112 is then again threaded in a clockwise direction through the threaded section 138 of the spring wire fastener 110. With the end 120 extending away from the bolt 112, as the bolt 112 is turned in a clockwise direction, the threaded section 138 of the spring wire fastener 110 is threaded along the main threaded portion 114 of the bolt 112 in the direction toward the panel 130. The bolt is rotated clockwise until the head 116 of the bolt engages with the surface 134 of the panel 130 and sufficient compressive force is developed on the spring wire fastener 110 between the threaded section 138 of the fastener that is engaged with threaded portion 114 of bolt and the end portion 140 of the fastener that is seated against the panel 130.

With reference to FIG. 8, the shape of the spring wire is designed such that the top surface 123 of the spring wire has a greater radius R1 than the radius R2 of the lower surface 124 of the spring wire. As a result, a cavity 126 is created between adjacent turns of spring wire.

Because of the shape of the spring wire, and particularly because of the cavity 126 created between each turn of the spring wire, when tightly secured, the spring wire fastener 110 exerts a tensile force on the bolt 112 in a manner similar to a Belleville or spring washer, thus eliminating the need for any type of lock washer.

In this alternative preferred embodiment, wherein the threaded portion 114 of the bolt 112 enqaqes directly with the turns of the threaded section 138 of the spring wire fastener 110, the profile of the wire, as seen in FIG. 8 forms a thread for engaging with the threads of the bolt 112. The thickness of the wire should be chosen so that it corresponds to the pitch of the thread on the bolt with which the spring wire fastener is intended to be used. For example, for a bolt having 36 threads per inch, a wire thickness of less than 0.027 inches is used such that the spring wire fastener has 36 turns per inch.

Figure 11:
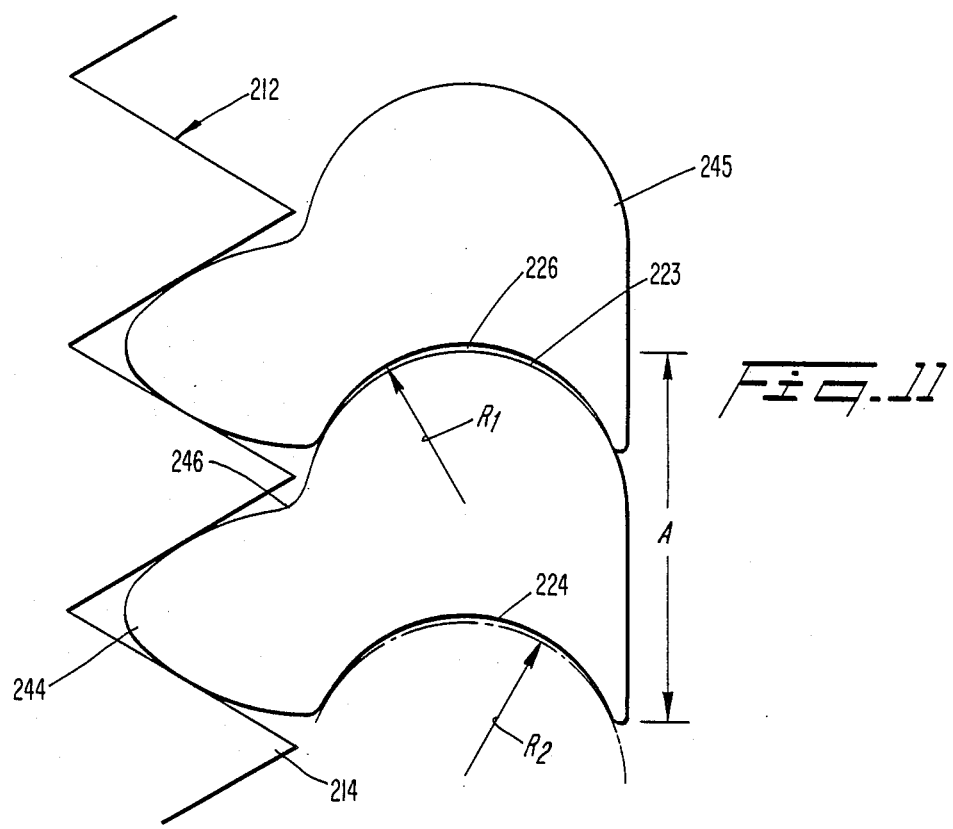
FIG. 11 is a cross-sectional view of a portion of a modification of the spring wire fastener of the present invention.

A modification of the alternative embodiment is shown in FIG. 11, which is an enlarged detailed view of a portion of a bolt 212 and two turns of a threaded section of a spring wire fastener 210 according to the present invention. In the embodiment shown in FIG. 11, one edge 244 of the spring wire is rounded to a dull point so as to enable engagement with the threads of the bolt 212. The opposite edge 245 is formed as a comparatively straight edge to minimize the outer diameter of the spring wire fastener. A main body portion of the spring wire has an upper surface 223 formed with a radius R1 and lower surface 224 having a radius R2. Radius R1 is slightly larger than radius R2 so as to create a cavity 226 between adjacent turns of the spring wire. The spring wire further includes a depression 246 in the upper surface 223. This depression 246 creates an enlarged space at the edge 244 between adjacent turns of the spring wire so as to accommodate broad threads in the bolt 112.

In the particular embodiment disclosed in FIG. 11, the radius R1 of the upper surface 223 is 0.0165 inch and the radius R2 of the lower surface 224 is 0.017 inch. The distance A between the crest of the upper surface 223 and the lowest point of the edge 245 is 0.038 inch. The pitch of the threads formed by the spring wire is 0.027 inch.

Figure 12:
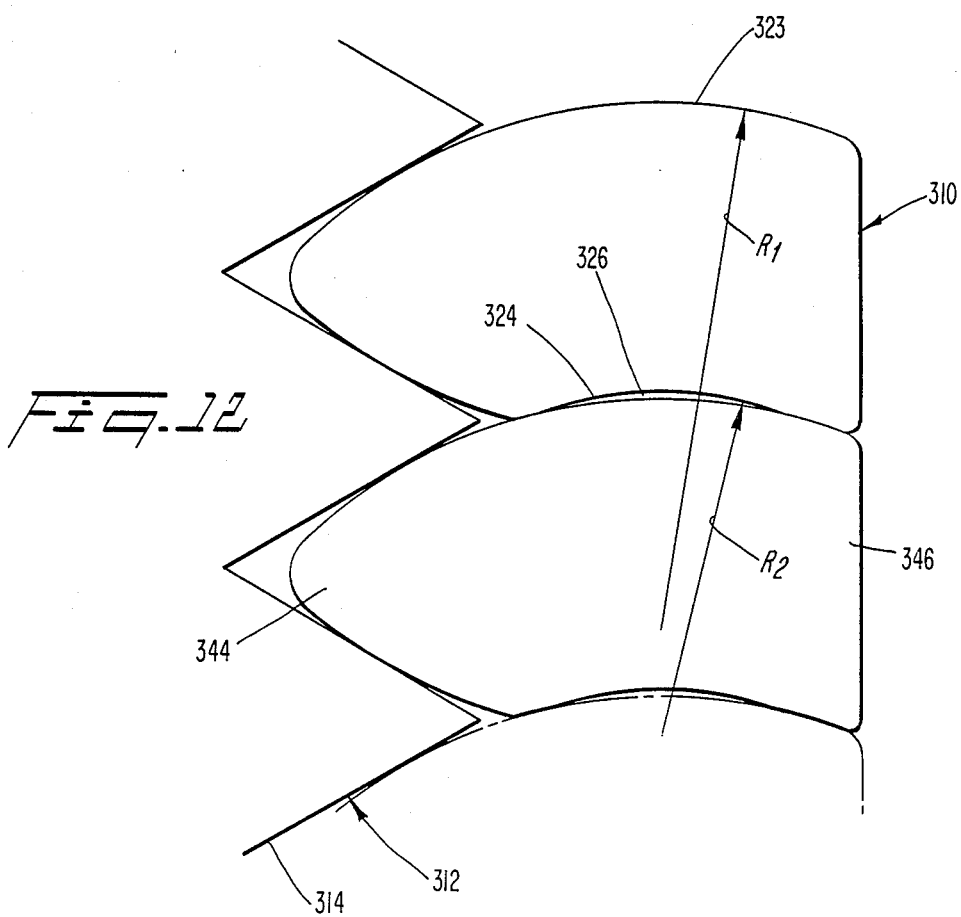
FIG. 12 12 is a cross-sectional view of a portion of yet another modification of the spring wire fastener of the present invention.

Turning attention to FIG. 12, another alternative spring wire is disclosed from which the spring wire fastener of the present invention may be made. In the embodiment of FIG. 12, an edge 344 of the spring wire is rounded to a dull point to fit between threads 314 of the bolt 312. A top surface 323 of the spring wire has radius R1 and the lower surface 324 of the spring wire has a radius R2. R1 is slightly larger than R2 so as to create a cavity 326 between adjacent turns of the spring wire. The edge 346 of each turn of the spring wire is substantially flat so as to minimize the width of the spring wire fastener 310.

The embodiments of the present invention may thus be made from a spring wire having a cross-sectional profile as shown in FIGS. 2, 11, or 12. Such spring wire can be prepared according to conventional methods known to those skilled in the art, and can be then wound into the forms disclosed in either FIGS. 1 or 7 on a spring winding machine by methods also known to those skilled in the art.

Although only preferred embodiments are specifically illustrated and described herein, it will be appreciated that many modifications and variations of the present invention are possible in light of the above teachings and within the preview of the appended claims without departing from the spirit and intended scope of the invention.

What is claimed is:

1. A spring wire fastener, comprising a single length of wire formed into a means for engaging the head of a bolt at one end thereof and a tapered coiled portion at the other end thereof, said tapered coiled portion tapering inwardly in a direction toward the engaging means, said spring wire being arcuate in cross section such that adjacent layers of the spring wire may nest together when the spring wire fastener is compressed.

2. The fastener of claim 1, further including a midsection between the engaging means and the tapered coiled portion, said midsection including a coiled portion of constant diameter.

3. The fastener of claim 1, wherein said engaging means is adapted to engage the head so as to prevent substantial relative rotation between the fastener and the bolt.

4. A spring wire fastener, comprising a single length of wire formed into a means for engaging the head of a bolt at one end thereof and a tapered coiled portion at the other end thereof, said tapered coiled portion tapering inwardly in a direction toward the engaging means wherein said single length of wire has a convex top surface and a concave bottom surface.

5. The fastener of claim 4, wherein the radius of the top surface is greater than the radius of the bottom surface.

6. A fastener, comprising:
a shaft having a threaded portion at one end and a fixed head at another end thereof;
coiled, tapered spring means mounted on said shaft for engaging with a surface on a panel adjacent an opening in the panel through which the shaft is to be attached; and
means for securing the tapered spring means to the fixed head of the shaft, said means including a tab extending across the fixed head of the shaft so as to prevent the spring means from sliding axially along the shaft.

7. The fastener of claim 6, wherein the securing means is adapted to engage the head so as to prevent substantial relative rotation between the tapered spring means and the shaft.

8. The fastener of claim 6, further including a coiled midsection of constant diameter between the tapered spring means and the securing means.

9. The fastener of claim 6, wherein the tapered spring means is made from a single length of spring wire having a convex top surface and a concave bottom surface.

10. The fastener of claim 9, wherein the radius of the top surface is greater than the radius of the bottom surface.

11. A spring wire fastener, comprising:
a first annular end portion having a first inner diameter;
an annular threaded section having an internal surface that includes means for engaging with the threaded portion of a bolt, the internal surface having a second diameter that is greater than said first inner diameter;

means for resiliently connecting the first annular end portion to one end of the annular threaded section; and a second end portion mounted to the opposite end of said annular threaded section, said second end portion having an inner diameter greater than the second diameter;

wherein the top surface of the spring wire is convex and the bottom surface of the spring wire is concave.

12. The fastener of claim 11, wherein the second end portion is conically tapered.

13. The fastener of claim 11, wherein said fastener is made from a resilient spring wire.

14. The fastener of claim 13, wherein the engaging means of the threaded section are threads formed by adjacent turns of the spring wire.

15. The fastener of claim 14, wherein the edge of the spring wire forming the interior surface of the fastener is rounded to a dull point and the opposite edge of the spring wire is flat.

16. The fastener of claim 15, wherein the radius of the top surface is greater than the radius of the bottom surface.

17. The fastener of claim 11, further comprising means extending from said second end portion for engaging the edge surface of a hole through which the fastener is inserted.

18. The fastener of claim 17, wherein the extending means is a "U" shaped hook.

19. A fastener, comprising:
annular means for engaging a threaded portion of a bolt;
a first end portion connected to one end of the annular engaging means, said first end portion adapted to move from a first position out of alignment with the annular engaging means to a second position where said first end portion prevents the bolt from being threaded into the annular engaging means beyond a predetermined point; and
a deformable second end portion connected to the end of the annular means opposite the first end portion, at least a portion of said second end portion having an outer diameter greater than the outer diameter of said annular engaging means.

20. The fastener of claim 19, further comprising means extending from the deformable second end portion for engaging the peripheral surface of a hole through which the bolt and fastener are inserted.

21. The fastener of claim 19, wherein said fastener is made from a resilient spring wire.

22. The fastener of claim 21, wherein the spring wire has a convex top surface and a concave bottom surface.

23. The fastener of claim 22, wherein the radius of the top surface is greater than the radius of the bottom surface.

24. The fastener of claim 21, wherein the edge of the spring wire forming an interior surface of the fastener is rounded to a dull point and the opposite edge of the spring wire is flat.

25. A method of fastening a bolt within a blind hole in a panel using a deformable coiled spring wire fastener, comprising the steps of:
securing a first end of the spring wire fastener to a fixed head of the bolt;
inserting the fixed head of the bolt through the blind hole;
deforming the spring wire fastener to reduce the diameter thereof so that is passes through the hole;
passing the bolt through the hole until the spring wire fastener is on the blind side of the panel and at least a part of the threaded portion of the bolt remains projecting out of the accessible side of the panel; and
fastening a nut to the threaded portion of the bolt and tightening the nut so as to exert a compressive force on the spring wire fastener and panel;
wherein the spring wire from which the spring wire fastener is made is arcuate in cross section and the fastening step includes the step of tightening the nut until the arcuate shape of the spring wire is compressed.

26. The method of claim 25, wherein the inserting step includes rotating the bolt in a clockwise direction to wind the spring wire fastener completely through the hole.

27. A method of fastening a bolt through a blind hole in a panel using a spring wire fastener, comprising the steps of:
aligning a first end of the spring wire fastener with a midsection of the spring wire fastener;
inserting a first end of a bolt through the midsection of the spring wire fastener until the bolt engages with the first end of the spring wire fastener;
inserting the first end of the bolt through the blind hole until the spring wire fastener is on the blind side of the hole;
withdrawing the bolt from the fastener a distance sufficient to release the first end of the spring wire fastener; and
rotating the bolt into the midsection of the spring wire fastener until the spring wire fastener and the bolt grip the panel through which the bolt is inserted.

28. The method of claim 27, wherein the step of inserting the bolt through the hole includes rotating the bolt in a clockwise direction to wind the spring wire fastener through the hole.

29. The method of claim 27, wherein the spring wire from which the spring wire fastener is made is arcuate in cross section and the rotating step includes rotating the bolt until the arcuate shape of the spring wire is compressed.

* * * * *